(12) United States Patent
Toyomura et al.

(10) Patent No.: US 7,869,429 B2
(45) Date of Patent: Jan. 11, 2011

(54) PACKET RELAYING APPARATUS WITH PAYLOAD RECONSTRUCTION FUNCTION

(75) Inventors: Takashi Toyomura, Yokohama (JP);
Naoki Mori, Yokohama (JP); Satoru Takashimizu, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 331 days.

(21) Appl. No.: 11/675,752

(22) Filed: Feb. 16, 2007

(65) Prior Publication Data
US 2007/0286211 A1 Dec. 13, 2007

(30) Foreign Application Priority Data
Jun. 7, 2006 (JP) ............... 2006-157981

(51) Int. Cl.
*H04L 12/28* (2006.01)
(52) U.S. Cl. ............ 370/389; 370/229; 370/392; 370/295.1; 370/395.64; 709/231
(58) Field of Classification Search .......... None
See application file for complete search history.

(56) References Cited

U.S. PATENT DOCUMENTS

| | | | | |
|---|---|---|---|---|
| 6,785,733 B1* | 8/2004 | Mimura et al. | ............... | 709/236 |
| 6,934,288 B2* | 8/2005 | Dempo | ............... | 370/394 |
| 7,386,013 B1* | 6/2008 | Beser | ............... | 370/477 |
| 7,404,200 B1 | 7/2008 | Hailey et al. | | |
| 7,525,993 B2* | 4/2009 | Yousef | ............... | 370/473 |
| 2002/0141448 A1* | 10/2002 | Matsunaga | ............... | 370/469 |
| 2005/0068914 A1* | 3/2005 | Lee et al. | ............... | 370/312 |
| 2005/0117583 A1* | 6/2005 | Uchida et al. | ............... | 370/395.4 |

FOREIGN PATENT DOCUMENTS

| | | |
|---|---|---|
| CN | 1256843 | 6/2000 |
| JP | 10-190734 | 7/1998 |
| WO | WO 2004/102906 | 11/2004 |

OTHER PUBLICATIONS

Postel, RFC762 Assigned Numbers, Jan. 1980, pp. 1-3.*
Schulzrinne, RFC3551 RTP Profile for Audio and Video Conferences with Minimal Control, Jul. 2003, pp. 1-3, 34-35.*
Schulzrinne, RFC1890—RTP Profile for Audio and Video Conferences with Minimal Control, Jan. 1996, pp. 1-2, 11-12.*

* cited by examiner

*Primary Examiner*—Ayaz R Sheikh
*Assistant Examiner*—Nicolas Sloms
(74) *Attorney, Agent, or Firm*—Antonelli, Terry, Stout & Kraus, LLP.

(57) ABSTRACT

A packet relaying apparatus comprises a payload type discrimination unit for discriminating the type of payload in each received packet, a payload reconstruction unit for dividing the payload in predetermined block size units and for reconstructing the payload in the predetermined block size units, and a controller for overall controlling the apparatus.

8 Claims, 8 Drawing Sheets

| IP HEADER 1 | UDP HEADER 1 | RTP HEADER 1 | TS PACKET 1 | TS PACKET 2 | TS PACKET 3 | TS PACKET 4 | TS PACKET 5 |
|---|---|---|---|---|---|---|---|

↓ DIVIDING

| IP HEADER 1 | UDP HEADER 1 | RTP HEADER 1 | TS PACKET 1 | TS PACKET 2 | TS PACKET 3 |
|---|---|---|---|---|---|

| IP HEADER 1 | UDP HEADER 1 | RTP HEADER 1 | TS PACKET 4 | TS PACKET 5 |
|---|---|---|---|---|

FIG.8

| IP HEADER 1 | UDP HEADER 1 | RTP HEADER 1 | TS PACKET 1 | TS PACKET 2 |

| IP HEADER 2 | UDP HEADER 2 | RTP HEADER 2 | TS PACKET 3 | TS PACKET 4 |

↓ COMBINING

| IP HEADER 1 | UDP HEADER 1 | RTP HEADER 1 | TS PACKET 1 | TS PACKET 2 | TS PACKET 3 | TS PACKET 4 |

US 7,869,429 B2

PACKET RELAYING APPARATUS WITH PAYLOAD RECONSTRUCTION FUNCTION

CLAIM OF PRIORITY

The present application claims priority from Japanese patent application serial No. 2006-157981, filed on Jun. 7, 2006, the content of which is hereby incorporated by reference into this application.

BACKGROUND OF THE INVENTION (1) Field of the Invention

The present invention relates to a packet relaying apparatus with a payload reconstruction function, and more particularly to a configuration to enhance the packet processing efficiency.

(2) Description of the Related Art

In connection with the scheduled discontinuation of terrestrial analog broadcasting, the possibility of using so-called IP broadcasting, namely digital broadcast transmission conforming to the Internet Protocol (IP), is studied as a solution to the problem of a blanket area or defective area in receiving terrestrial digital broadcasts. It is proposed to configure the network for carrying out IP broadcasting with Fiber-Distributed Data Interfaces (FDDIs) from the transmitting apparatus to home inlets and with the Ethernet from home inlets to receiving apparatuses.

In IP broadcasting, a plurality of TS (Transport Stream) packets are forwarded a an IP packet from by adding a header to a set of TS packets. In usual packet forwarding in conformity with IP, the total size of packet is limited by a maximum transmission unit (MTU) defined for each physical layer of the communication path. For instance, the MTU for the Ethernet is 1,500 bytes and that for the FDDI is 4,352 bytes.

When an IP packet having a size greater than the MTU of the communication path is transmitted, a relaying apparatus located at the entrance of the communication path will divide that IP packet into a plurality of IP packets (IP fragmentation). Japanese Unexamined Patent Publication NO. H10-190734 (patent document 1) discloses a technique for dividing an IP packet into a plurality of packets having a suitable size by a packet relaying apparatus when the IP packet is transmitted from a communication path with a larger MTU to another communication path with a smaller MTU.

SUMMARY OF THE INVENTION

However, according to the technique described in the patent document 1, the payload is divided into arbitrary size units, in disregard of the original grouping of video signals. Therefore, a receiving apparatus cannot individually process the received IP packet as they are in the fragmented state. In this case, in order to reproduce proper original video signals, the receiving apparatus requires reception of all the divided IP packets to restore the original IP packet.

The technique described in the patent document 1takes no heed of such problems including the drop in processing efficiency of the receiving apparatus due to the aforementioned restoring the original IP packet and the need for an extra memory capacity for storing divided IP packets.

Furthermore, as the absence of any one of the divided IP packets would make it impossible to restore the original IP packet, there is another problem that any partial loss or bit error occurred in the IP packet receiving would waste the divided IP packets having been received earlier. Especially in the IP broadcasting of a high bit rate, any partial loss or error occurred in the IP packet receiving would directly invite deterioration in picture quality because there is no time available for retransmitting the IP packet having been failed in receiving.

In view of these problems, an object of the present invention is to provide a packet relaying apparatus which enables each receiving apparatus to receive and process IP packets efficiently.

In order to resolve the problems noted above, the payload of each IP packet is reconstructed in units of predetermined packet length, in 188 byte units for TS packets for instance, to generate IP packets having the size matching the communication path of their destination. In a case where the payload is reconstructed in TS packet units, a receiving apparatus can process received IP packet on each occasion without restoring the original IP packet from divided IP packets.

In order to reconstruct the payload in TS packet units, the packet relaying apparatus is configured so as to determine whether the payload of a received IP packet comprises TS packets, and to generate new IP packets by reconstructing their payloads in TS packet units.

The payload of the received IP is determined by a payload type discrimination unit whether it is comprised of TS packets. If the payload comprises TS packets, a payload reconstruction unit reconstructs the payload in TS packet units, adds a header and transmits as an IP packet.

The word "reconstruction" in this context means adaptation of the payload of the received IP packet to the circumstances of the communication path toward its destination, involving, for example, partial deletion of the payload of the IP packet, addition of some other factor to it, dividing the IP packet or combining a plurality of IP packets in predetermined packet size units.

According to the invention, a packet relaying apparatus which enables each receiving apparatus to receive and process IP packets efficiently can be provided.

BRIEF DESCRIPTION OF THE DRAWINGS

FIG. 8 shows the configurations of an IP packet before and after combining payloads in the ONU pertaining to the second embodiment of the invention.

DETAILED DESCRIPTION OF THE PREFERRED EMBODIMENTS

Preferred embodiments of the invention will be described in detail below with reference to the accompanying drawings.

The First Embodiment

As a first embodiment of packet relaying apparatus, a optical line termination apparatus, which is referred to as an optical network unit (ONU), will be described.

Figure 1:
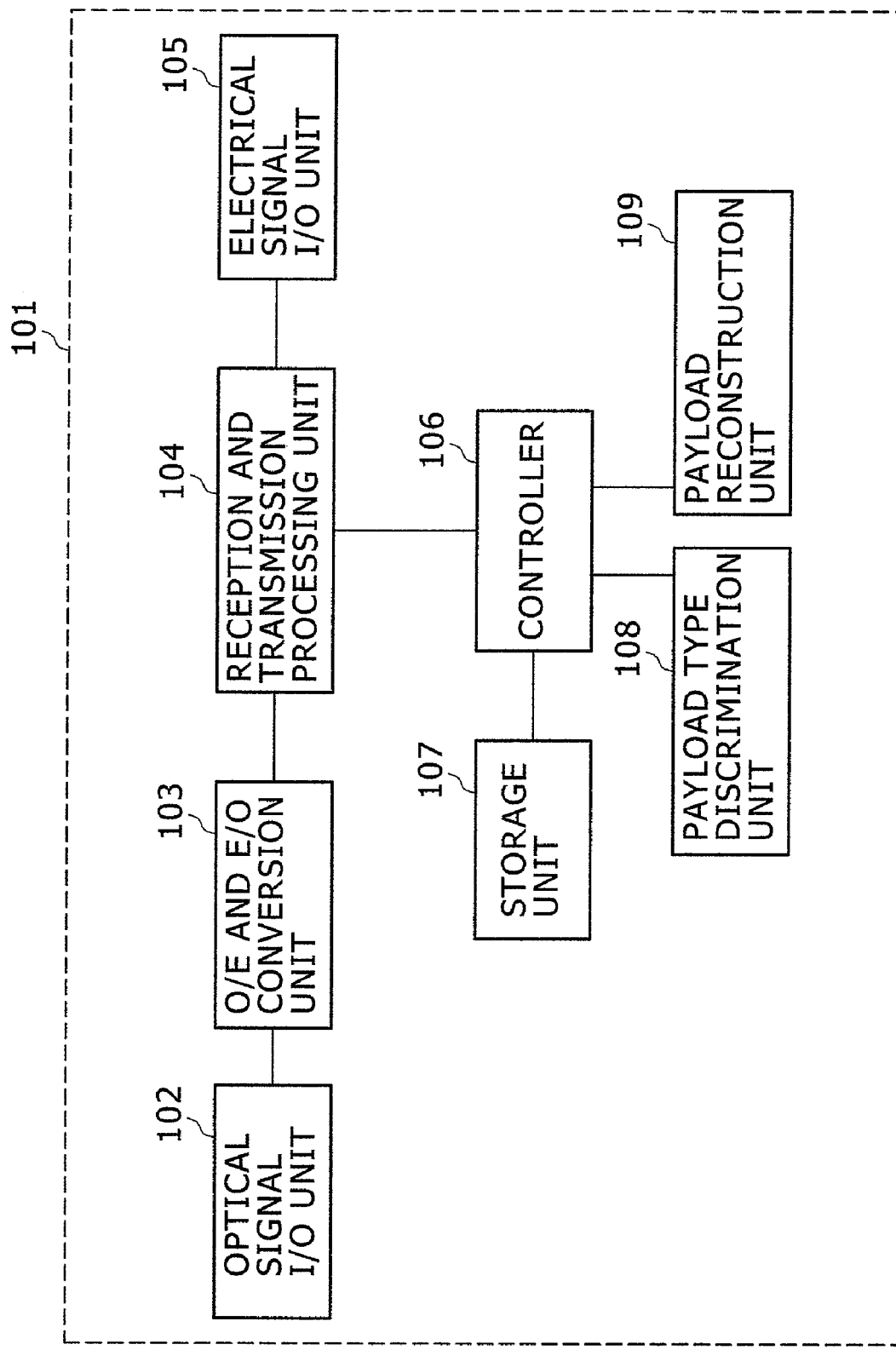
FIG. 1 is a block diagram showing the configuration of an optical network unit (ONU) in a first embodiment of the present invention.

FIG. 1 schematically shows an example of configuration of an ONU pertaining to the first embodiment of the invention. The ONU 101 comprises an optical signal input/output unit 102 for transmitting and receiving IP packets as optical signals, an O/E and E/O conversion unit 103 for converting optical signals into electrical signals and vice versa, a reception and transmission processing unit 104 for checking the destination address of each packet and judging whether it is an IP packet to be forwarded, and an electrical signal input/output unit 105 for transmitting and receiving IP packets as electrical signals. The ONU further comprises a controller 106 for performing overall control of ONU by transmitting instructions signals and the like to each component unit constituting the ONU, and a storage unit 107 for temporarily storing IP packets before processing them by the reception and transmission processing unit 104.

Although description will be made in this embodiment in a case where an IP packet is received by the optical signal I/O unit 102 and transmitted from the electrical signal I/O unit 105, this does not limit the IP packets in the present invention to the forwarding direction from the FDDI to the Ethernet.

A payload type discrimination unit 108 determines whether the payload of the IP packet, which has been received by the optical signal I/O unit 102 and converted into electrical signals by the conversion unit 103, comprises TS packets or not. When the payload type discrimination unit 108 determines that the payload of the IP packet comprises TS packets, a payload reconstruction unit 109 reconstructs the payload in TS packet units. Although description will be made in this embodiment in a case where the payload includes TS packets, this does not mean limiting the object to be reconstructed to a payload including only TS packets.

When the payload is comprised of a plurality of fixed-length packets, payload reconstruction can be accomplished in the same way as this embodiment by providing means for identifying the type of the fixed-length packets and the size of each packet.

Figure 2:
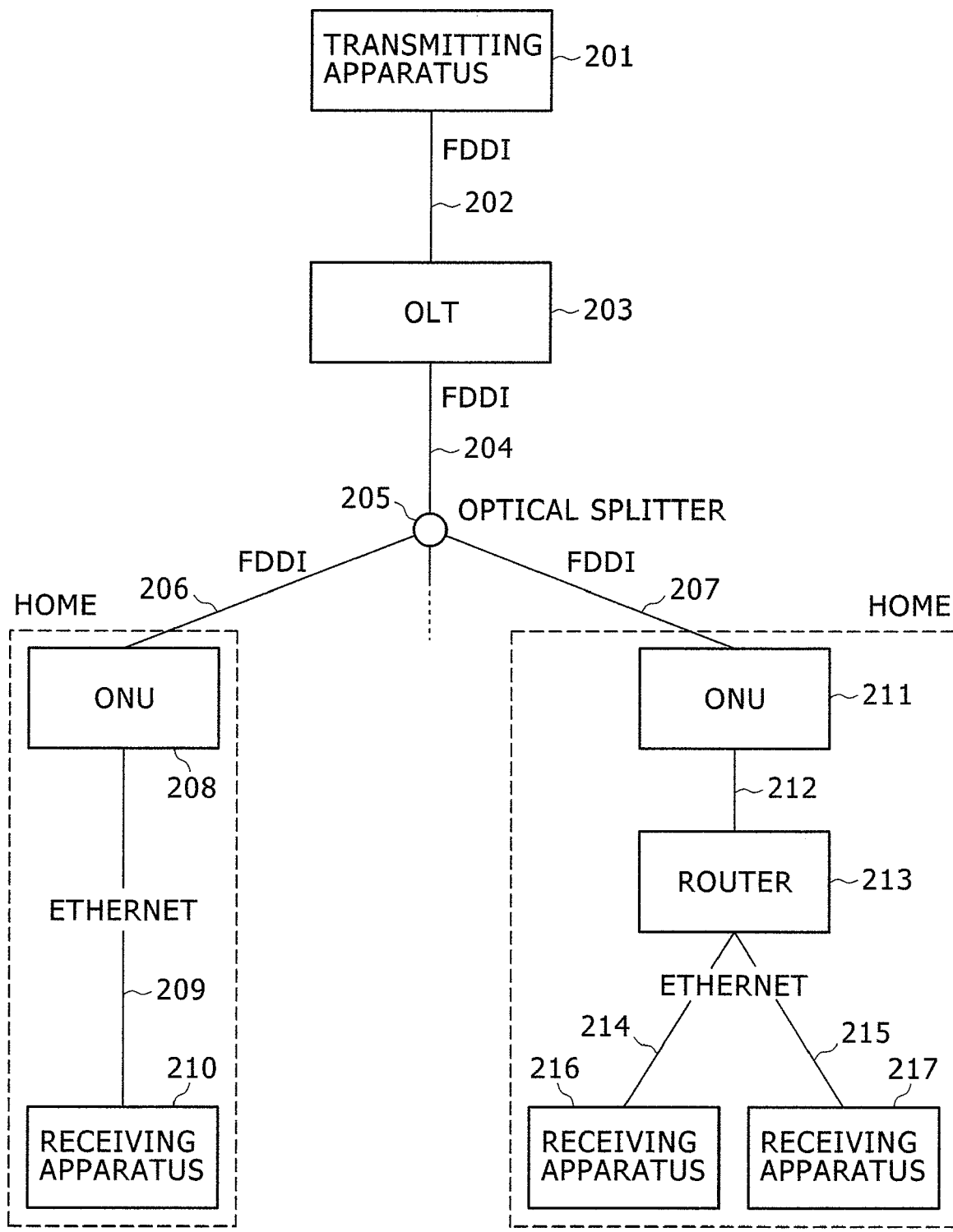
FIG. 2 shows an example of configuration currently contemplated for a communication network for carrying out IP broadcasting.

FIG. 2 shows an example of a communication network configuration currently contemplated for carrying out IP broadcasting. The ONU corresponds to the information inlet to each home in the network shown in FIG. 2. While description will be made in this embodiment on the ONU in particular, the processing sequence of this embodiment is applicable to other relaying apparatus, such as a route 213.

The IP packet transmitted from a transmitting apparatus 201 is delivered to individual homes, after passing through an optical line terminal (OPT) 203 which is an office station unit and being brunched by an optical splitter 205. Each of communication paths from the transmitting apparatus 201 to an ONU 208 or an ONU 211 at the inlet of the home is comprised of an FDDI, for instance, over which IP packets are transmitted as optical signals. The communication path inside the home is comprised of Ethernet, for instance, and the ONU 208 or the ONU 211 converts the optical signals into electrical signals to forward the IP packet to the receiving apparatus.

Figure 3:
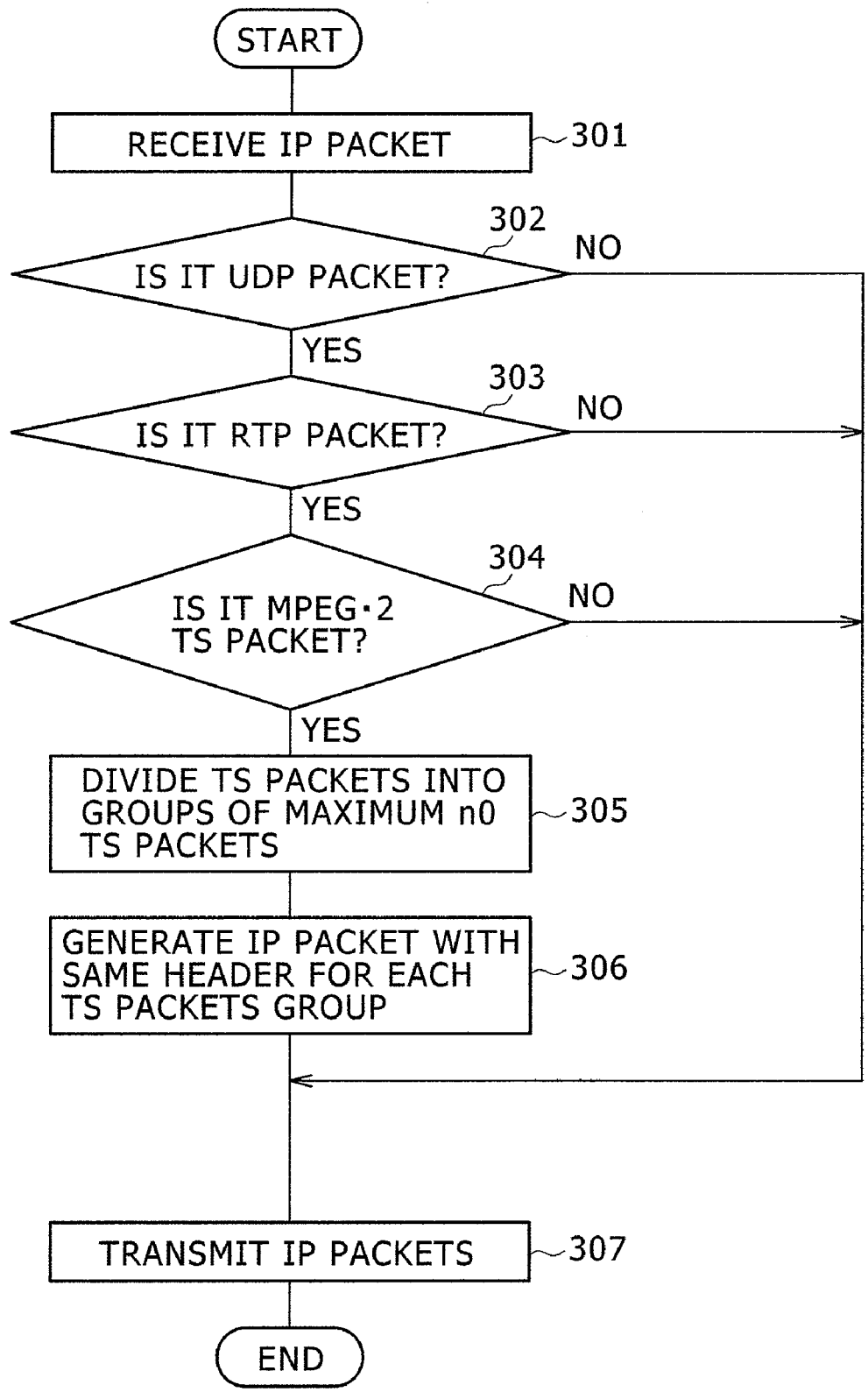
FIG. 3 is a flow chart showing a processing sequence of dividing the payload of an IP packet in TS packet units, which is performed in the ONU pertaining to the first embodiment of the invention.
Figure 4:
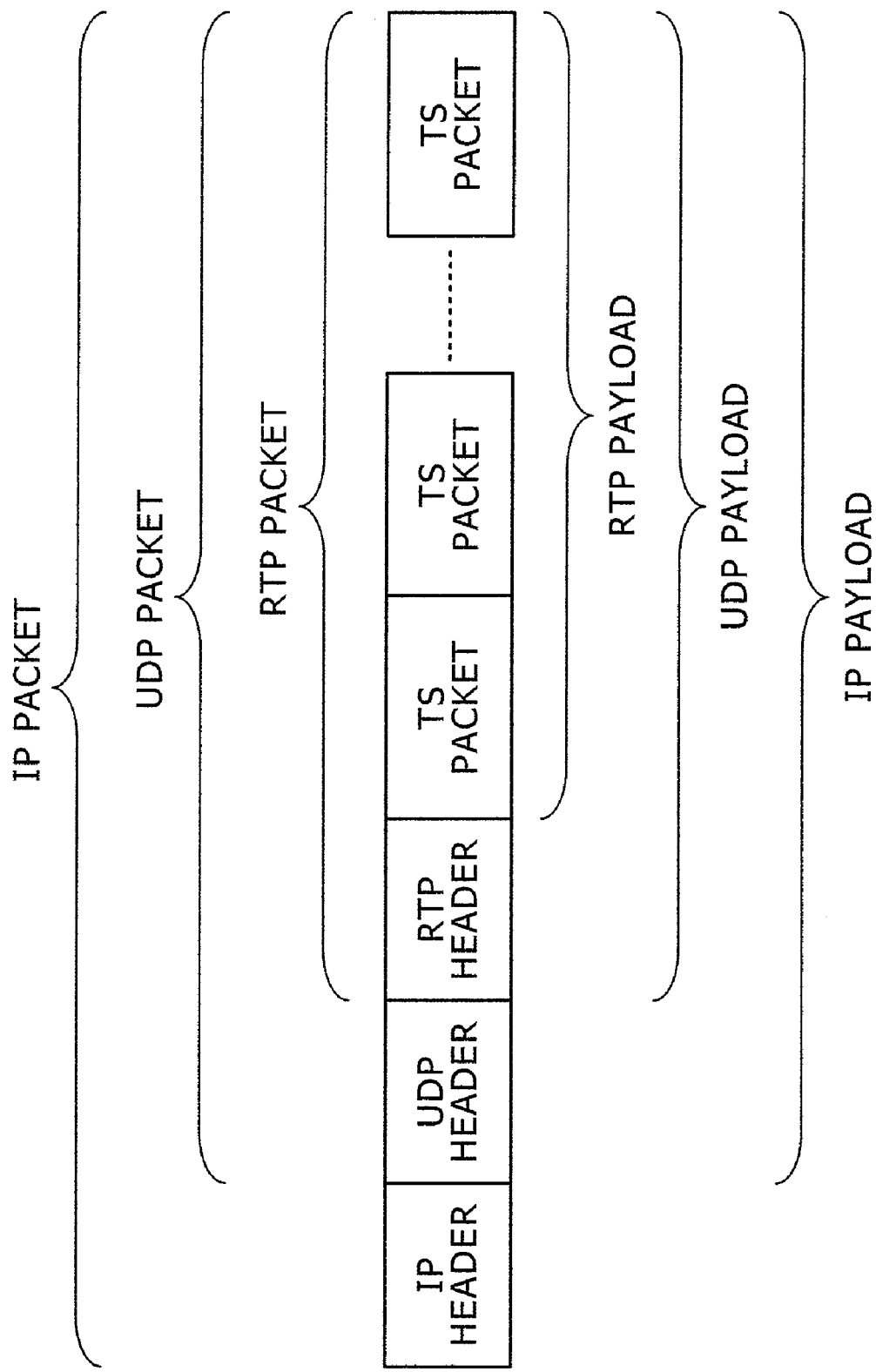
FIG. 4 shows the configuration of an IP packet to be handled in the ONU pertaining to the first embodiment of the invention.

FIG. 3 is a flow chart showing a processing sequence of dividing the payload of an IP packet in TS packet units, in a case where the ONU of this embodiment receives the IP packet configured as shown in FIG. 4. Although a description will be made in a case where TS packets are forwarded in a hierarchical packet form having a Real-time Transport Protocol (RTP) header, a User Datagram Protocol (UDP) header and an IP header as shown in FIG. 4 in this embodiment, this is not mean to limit the forwarding protocol of TS packets to the RTP/UDP/IP. AS the forwarding protocol, for instance, the Hyper Text Transfer Protocol (HTTP), the Transmission Control Protocol (TCP), the File Transfer Protocol (FTP), the Simple Mail Transfer Protocol (SMTP) or the Post Office Protocol (POP) is also applicable.

At step 301, an IP packet is received as electrical signals via the optical signal I/O unit 102, the O/E and E/O conversion unit 103 and the reception and transmission processing unit 104. After completing the processing at step 301, the processing sequence shifts to step 302. The processing at steps 302 to 304 is mainly performed by the payload type discrimination unit 108. At step 302, the IP header of the received IP packet is analyzed to determine whether an IP payload of received packet includes a UDP packet.

The IP header has a protocol number field in which a value of "17" is set when the IP payload includes a UDP packet. The processing at the next step 303 is executed when it was judged that the IP payload includes a UDP packet. If it was judged at step 302 that the IP payload does not include a UDP packet, the processing sequence advances to step 307 and the IP packet is transmitted.

When it was judged at step 302 that the IP payload includes a UDP packet, the processing sequence shifts to step 303 and it is judged whether a UDP payload includes an RTP packet. If a value of "5004" is set in a destination port field of the UDP header, the UDP payload includes an RTP packet.

The processing at next step 304 is executed when it was judged that the UDP payload includes an RTP packet. If it was judged at step 303 that the UDP payload does not include RTP packet, the processing sequence advances to step 307 and the IP packet is transmitted.

The value "5004" is a default destination port number to be set in the destination port field, prescribed by the Internet Assigned Number Authority (IANA), and another port number other than "5004" may be used as a value indicative of RTP packet, by notifying from the transmitting apparatus.

If it was judged at step 303 that the UDP payload includes an RTP packet, the processing sequence shifts to step 304 and it is judged whether an RTP payload includes TS packets. If a value of "33" is set in a payload type field of the RTP header, it means that the RTP payload includes TS packets. Following steps 305 and 306 are executed when it was judged that the RTP payload includes TS packets. If it was judged at step 304 that the RTP payload includes no TS packet, the processing sequence advances to step 307 and the IP packet is transmitted.

When it was judged at step 304 that the RTP payload includes TS packets, the processing sequence shifts to step 305. The processing at steps 305 and 306 is mainly performed by the payload reconstruction unit 109.

At step 305, TS packets being included as the RTP payload are extracted and divided into groups of maximum n0 TS packets. After completing the processing at step 305, the processing sequence shifts to step 306.

The value of number n0 may be either a predetermined fixed value or a value selectable by a user or the receiving apparatus as a functional setting parameter.

At step 306, the original RTP header, the UDP header and the IP header are added to each group of TS packets generated at step 305, and these TS packets are converted into IP packets group by group. In this way, every IP packets generated at step 306 have the same header.

Figure 5:
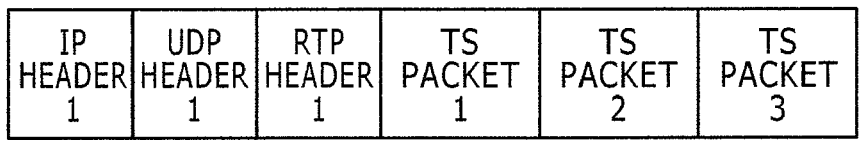
FIG. 5 shows the configurations of an IP packet before and after dividing the payload in the ONU pertaining to the first embodiment of the invention.

FIG. 5 shows an example in which an IP packet including three TS packets and an IP packet including two TS packets are generated from an IP packet including five TS packets as its payload.

If processing at step 306 invites duplication of the sequence number of the RTP headers, there is possibility that the receiving apparatus having received such IP packets judges erroneous packet forwarding. If the receiving apparatus has possibility of discarding a IP packet whose sequence number is duplicated, it is preferable to make discriminative individual IP packets by using a header extended field and a extended bit field of the RTP header. After completing the processing of step 306, the processing sequence shifts to step 307.

At step 307, each IP packet generated at step 306 is transmitted from the electrical signal I/O unit 105. when it was judged at any of steps 302, 303 and 304 not to perform any further processing, the sequence promptly advances to step 307 to transmit the IP packet. With the processing at step 307, all processing on a received IP packet is completed in this embodiment.

Incidentally, if the receiving speed of IP packets is so high that the volume of IP packets to be temporarily stored surpasses the capacity of the storage unit 107, IP packets may be sent out as they are on a first-in first-out basis from the storage unit when the volume of IP packets saved in the storage unit has surpassed a threshold which is determined as desired.

The technical idea described above is applicable to data transmitted with interleaved packets. For instance, even when each TS packet themselves is divided into a plurality of smaller subunits and the resultant subunits are altered in sequence, processing for restoring images can be efficiently accomplished by performing division processing and combination processing with reference to that subunit length.

According to the first embodiment of the invention described so far can securely and easily restore original IP packets, and prevent such deteriorations in picture quality or sound quality as intermittent reproduction of video or audio signals or complete failure to reproduce them. Further, by performing payload dividing in coherent units, such as TS packets, it becomes unnecessary to restore original video signal and audio signal in the relaying apparatus. Accordingly, since the efficiency of the CPU and memories is improved, the relaying apparatus can be configurable with low-priced CPUs and memories.

The Second Embodiment

Although description was made in the first embodiment about payload processing for dividing the payload of an IP packet in TS packet units, the present invention is also applicable to payload processing, not only for dividing the payload in TS packet units but also for combining payloads of a plurality of IP packet in TS packet units.

Figure 6:
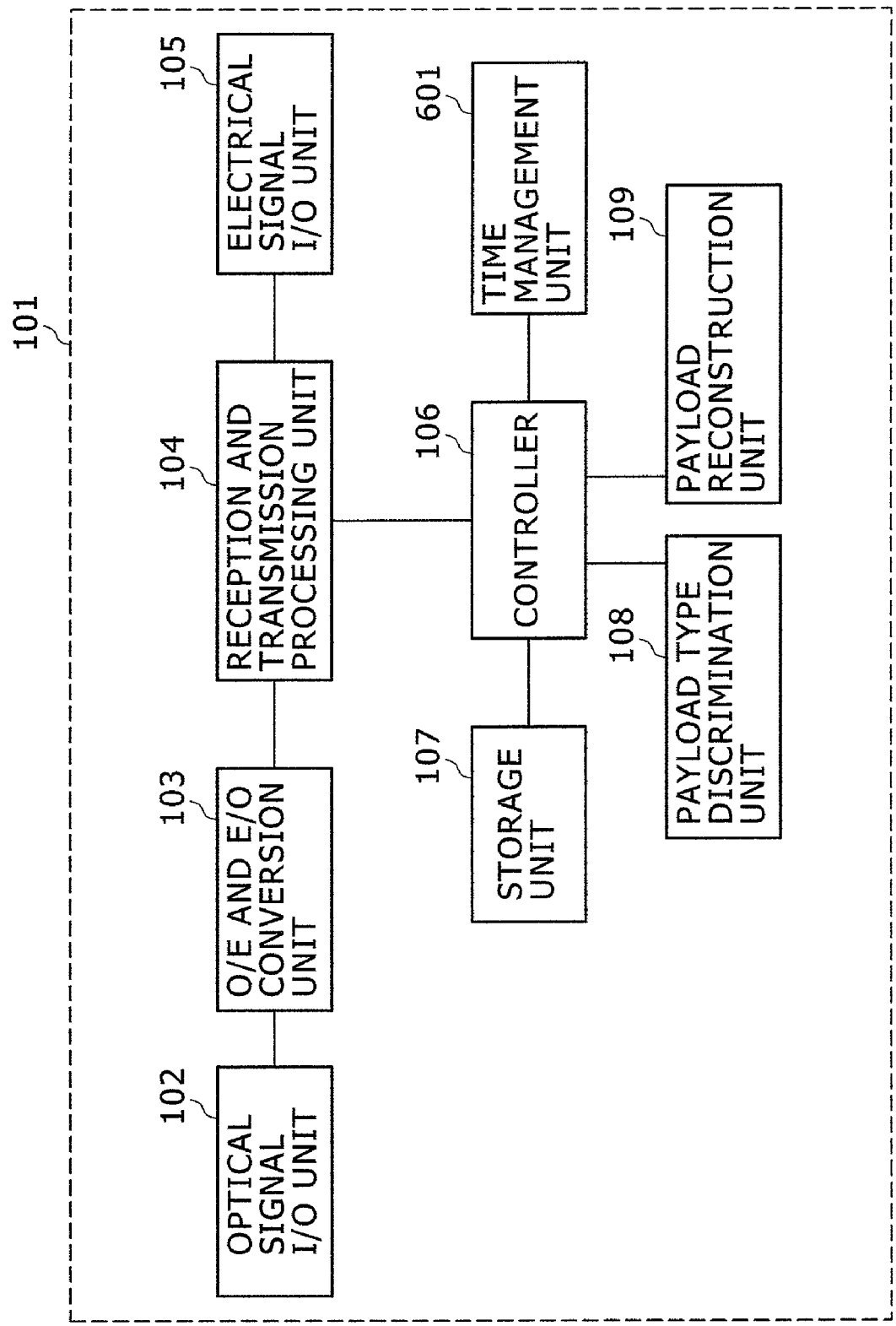
FIG. 6 is a block diagram showing the configuration of the ONU pertaining to a second embodiment of the invention.

FIG. 6 schematically shows the configuration of an ONU pertaining to the second embodiment of the invention.

Here, the ONU 101, optical signal input/output (I/O) unit 102, O/E and E/O conversion unit 103, reception and transmission processing unit 104, electrical signal input/output (I/O) unit 105, controller 106, storage unit 107, payload type discrimination unit 108 and payload reconstruction unit 109 are equivalent to components with the same names shown in FIG. 1. A time management unit 601 manages the time length during which each IP packet is held in the storage unit 107 before the payload reconstruction unit 109 reconstructs an RTP payload of the IP packet.

Figure 7:
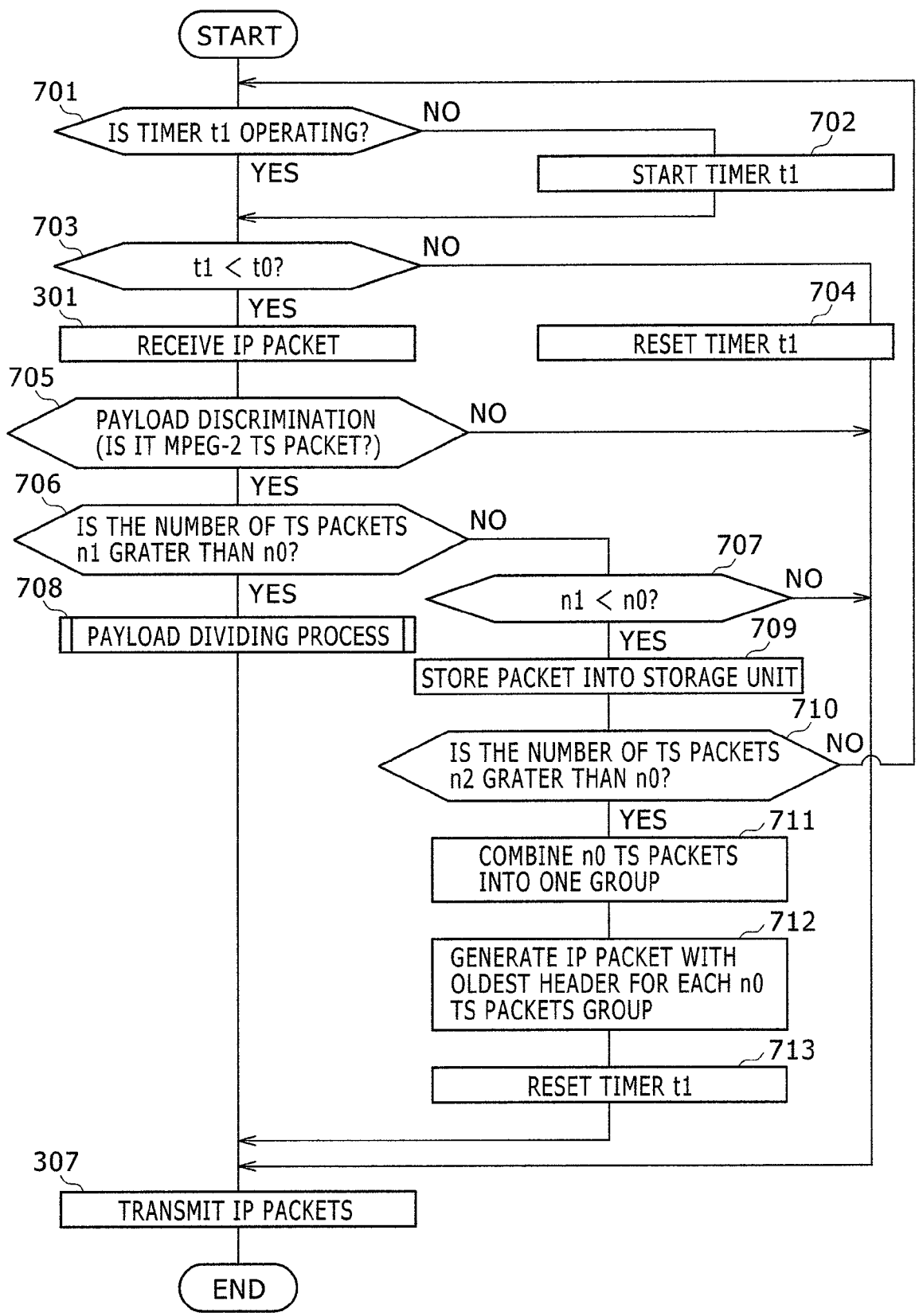
FIG. 7 is a flow chart showing a processing sequence of dividing the payload of an IP packet in TS packet units and combining payload of IP packets in TS packet units, in the ONU pertaining to the second embodiment of the invention.

FIG. 7 shows a processing sequence of dividing a payload and combining payloads in TS packet units by the ONU pertaining to the second embodiment in the case where received IP packets have the configuration shown in FIG. 4.

At step 701, it is determined whether a timer t1 is already operating. If an IP packet is held on in the storage unit 107 beyond a specific length of time, it causes a problem that video and audio signals fail to be properly outputted. For this reason, the timer t1 is disposed here to measure how long the IP packet has been held before it is transmitted. That is, IP packet reception and payload reconstruction are repeated until the specific length of time passes. Processing regarding the timer t1 is performed by the time management unit 601.

If it is found at step 701 that the timer t1 is not operating, namely if it is immediately after the ONU starts its operation or immediately after the transmission of an IP packet, the processing sequence shifts to step 702 at which the timer t1 is set. After completing the processing at step 702, the processing sequence shifts to step 703.

If the timer t1 is found already operating at step 701 or the processing at step 702 has completed, the processing sequence shifts to step 703 at which it is determined whether the timer t1 has elapsed a specific length of time t0. When the timer t1 has elapsed the specific length of time t0, the timer t1 is reset at step 704, and processing sequence advances to step 307 to send out the IP packets held in the storage unit 107.

Here, the length of time t0 may be given as a fixed value. Instead of using the fixed value, the length of time t0 may be a value selectable by the user or the receiving apparatus as a functional setting parameter. The latter will be more convenient for the user.

If it was found at step 703 that the timer t1 has not yet elapsed the time length t0, the processing sequence shifts to step 301 and then to step 705. At step 301, processing similar to the first embodiment is performed. At step 705, processing similar to step 302, step 303 and step 304 in the first embodiment is performed. Processing at step 705 is mainly performed by the payload type discrimination unit 108.

If it was judged at step 705 that the payload includes TS packets, the processing sequence shifts to step 706. The processing at step 706, step 707, step 708, step 710, step 711 and step 712 is performed mainly by the payload reconstruction unit 109.

At step 706, the number n1 of TS packets in the RTP payload is calculated to determine whether the number of TS packets is greater than a specific number n0. Here, the value of number n0 may be either a predetermined fixed value or a value selectable by a user or the receiving apparatus as a functional setting parameter. The latter will be more convenient for the user.

If it was judged at step 706 that the number of TS packets n1 is greater than n0, the processing sequence shifts to step 708 to start payload dividing process. At step 708, processing similar to step 305 and step 306 in the first embodiment is performed. If it was judged at step 706 that the number of TS packets n1 is not greater than n0, namely if the payload includes TS packets not more than n0, the processing sequence shifts to step 707 at which it is determined whether the number of TS packets n1 is smaller than n0.

If it was judged at step 707 that the number of TS packets n1 is not smaller than n0, namely in the case where the number of TS packets n1 was judged equal to n0 with the judging result at step 706 also taken into account, the processing sequence immediately advances to step 307 to transmit the IP packet. If it was judged at step 707 that the number of TS packets n1 is smaller than n0, the processing sequence shifts to step 709 to start payload combining process. At step 709, the IP packet is stored into the storage unit 107. After completing the processing at step 709, the processing sequence shifts to step 710.

At step 710, the total number n2 of TS packets in the payload is calculated for all the IP packets held in the storage unit 107 to judge whether the total number n2 is greater than n0. If the total n2 was found not greater than n0, the processing sequence returns to step 701 to check the timer t1 and receive a new IP packet.

If it was determined at step 710 that the total number n2 is greater than n0, the processing sequence shifts to step 711 at which n0 TS packets are taken out of the total n2 TS packets and put together into a group. Here, the n0 TS packets are taken out on a first-in first-out basis. After completing the processing at step 711, the processing sequence shifts to step 712.

At step 712, a new IP packet is generated by adding an RTP header, a UDP header and an IP header to the group of n0 TS packets taken out at step 711. For the RTP header, the UDP header and the IP header, headers added to the oldest TS packet in reception time out of the n0 TS packets are used.

FIG. 8 shows a case in which an IP packet including four TS packets is generated from two IP packets each including two TS packets as its payload. If the receiving apparatus has possibility of losing normal processing when the sequence numbers of RTP headers have become discontinuous, it is preferable to indicate, by using a header extended field and a extended bit field of the RTP header, that combining process of IP packets has been performed.

After completing the processing at step 712, the timer t1 is reset at step 713 and the processing sequence shifts to step 307. At step 307, the IP packets are transmitted from the electrical signal I/O unit 105. With the processing at step 307, the processing sequence of this embodiment ends.

Incidentally, when a plurality of IP packets different in destination address have to be processed by the configuration shown in FIG. 7, a plurality of timers t2, t3, t4 . . . are prepared one for each destination address and IP packets are stored in the storage unit 107 by destination address so that IP packets can be managed for each destination address using one of the timers.

Although the second example indicates an example in which the IP packet dividing process and the IP packet combining process do not coexist for a sufficiently long period, for instance, while one content is being received, it is also possible to mix these process by appropriately managing payloads.

It is supposed, for instance, that the transmitting apparatus sends out IP packets without fixing the number of TS packets in each IP payload. In a case where the maximum number of TS packets n0 is six, and the number of TS packets held by the received IP payload is four or eight, the packet relaying apparatus may be configured so as to selectively switching-over the type of processing so that the combining process is performed when received IP payload includes four TS packets and the dividing process when the payload includes eight TS packets.

These integrated processing can be controlled by the controller 106. The controller 106 compares the value of n0 and the number of TS packets in the IP payload received now.

If the number of TS packets smaller than the value of n0, the controller 106 outputs to the payload reconstruction unit 109 a combining process instruction signal indicating an instruction to combine IP payloads, and the payload reconstruction unit 109 having received that combining process instruction signal performs combining process on IP payloads. On the other hand, if the number of TS packets is greater than the value of n0, the controller 106 outputs to the payload reconstruction unit 109 a dividing process instruction signal indicating an instruction to divide the IP payload, and the payload reconstruction unit 109 having received that dividing process instruction signal performs dividing process to divide the TS packets into two groups.

Such a configuration makes possible appropriate TS packets processing every time even when transmission takes place without fixing the number of TS packets in the IP payload. Furthermore, the processing sequence of the second embodiment, like that of the first embodiment, is applicable to other packet relaying apparatuses, such as the router 213 shown in FIG. 2, for instance.

By providing the time management unit 601 and by combining payloads in TS packet units as described above, the transfer efficiency can be enhanced on both communication paths when IP packets are transferred from a communication path having a small MTU to another having a large MTU, such as IP packet forwarding from the Ethernet to an FDDI or IP packet forwarding from an FDDI to the Ethernet having a jumbo frame function.

Incidentally, the structural blocks shown in FIG. 1 or FIG. 6 need not be configured as separate hardware products. According to the design specifications or design requirements, for instance, the reception and transmission processing unit 104, the controller 106, the storage unit 107, the payload type discrimination unit 108 and the payload reconstruction unit 109 can be configured of a single LSI.

What is claimed is:

1. A packet relaying apparatus comprising:
   an input unit for receiving data packets for transfer from a first communication path to a second communication path having a Maximum Transmission Unit (MTU) smaller than that of the first communication path, the data packets each comprising a header portion and a payload from the first communication path;
   a payload type discrimination unit for discriminating a specific data packet having a payload that includes a group of transport stream (TS) packets and a header portion that includes header information indicating that the payload includes TS packets, out of the data packets received by the input unit;
   a payload reconstruction unit for judging whether the number of TS packets in the payload of the specific data packet exceeds a predetermined threshold which depends on the MTU of the second communication path, dividing the group of TS packets in the payload of the specific data packet unit, in TS packet size units into sub-groups of TS packets when the number of TS packets exceeds the predetermined threshold, and generating a plurality of reconstructed data packets each including a payload including one of the sub-groups and a header portion including the header information indicating that the payload includes TS packets; and
   an output unit for outputting the reconstructed data packets generated by the payload reconstruction unit, the specific data packet judged that the number of TS packets does not exceed the predetermined threshold, and data packets judged other than the specific data packet, to the second communication path.

2. The packet relaying apparatus according to claim 1, wherein each of said reconstructed data packets includes said header information indicating that the payload includes TS packets, within a Real-time Transport Protocol (RTP) header of said header portion.

3. The packet relaying apparatus according to claim 1, wherein said input unit receives said data packets from said first communication path through a Fiber-Distributed Data Interface (FDDI).

4. The packet relaying apparatus according to claim 1, wherein said reconstructed data packets are outputted by said output unit to said second communication path after having been converted into electrical signals for the Ethernet.

5. A packet relaying apparatus comprising:
   an input unit for receiving data packets for transfer from a first communication path to a second communication path having a Maximum Transmission Unit (MTU) smaller than that of the first communication path, the data packets each including a header portion and a payload from the first communication path;
   a payload type discrimination unit for discriminating a specific data packet having a payload that includes a plurality of transport stream (TS) packets and a header portion that includes header information indicating that the payload includes TS packets, out of the data packets received by the input unit;
   a payload dividing/combining unit for selectively dividing the payload of the received specific data packet discriminated by said payload type discrimination unit in TS packet size units into sub-groups of TS packets, selectively combining the TS packets in the payload of the received specific data packet with a payload of another data packet having been received before the specific data packet, and generating a plurality of reconstructed data packets each including a payload including a plurality of TS packets, the number of which does not exceed a predetermined threshold dependent on the MTU of the second communication path, and a header portion including the header information indicating that the payload includes TS packets;
   an output unit for selectively outputting the received specific data packet, data packets judged other than the specific data packet by the payload type discrimination unit and the reconstructed data packets generated by the payload dividing/combining unit, to the second communication path;
   a storage unit for temporarily storing the received specific data packets when the payload includes TS packets less than the predetermined threshold; and
   a controller for judging whether the number of TS packets in the payload of received specific data packet exceeds the predetermined threshold, instructing said payload dividing/combining unit to generate the reconstructed data packet by dividing the payload of received specific data packet into sub-groups of TS packets when the number of TS packets in the payload exceeds the predetermined threshold, to output the received specific data packet to said output unit when the number of TS packets in the payload is equal to the predetermined threshold, and to combine one or more of the TS packets in the payload of received specific data packet with the TS packets of at least one specific data packet stored in said storage when the number of TS packets in the payload of the received specific data packet is smaller than the predetermined threshold value so as to generate a specific data packet having a payload including a plurality of TS packets corresponding to the predetermined threshold.

6. The packet relaying apparatus according to claim 5, wherein said payload dividing/combining unit performs division of the payload of said received specific data packet in TS size units upon receiving a dividing instruction from said controller, and performs combination of the payloads in TS size units upon receiving a combining instruction from said controller.

7. The packet relaying apparatus according to claim 5, further comprising a time measuring unit for measuring a stay duration of said specific data packet having been stored in said storage unit, and outputting the stored specific data packet to said output unit when the stay duration of the stored specific data packet reaches a predetermined time limit.

8. A packet relaying apparatus comprising:
   an input unit configured to receive data packets from a first communication path, at least one of received data packets including a payload including a group of transport stream (TS) packets, the number of which exceeds a predetermined threshold dependent on the MTU of a second communication path, and a header indicating that the payload includes TS packets, wherein the second communication path has a Maximum Transmission Unit (MTU) smaller than that of the first communication path;
   a payload type discrimination unit configured to discriminate a specific data packet that includes TS packets in the payload thereof, out of the data packets received by the input unit;
   a payload reconstruction unit configured to judge whether the number of TS packets in the payload of the specific data packet exceeds the predetermined threshold and to divide the group of TS packets in the payload of the specific data packet into sub-groups of TS packets provided in only TS-packet-sized units when the number of TS packets exceeds the predetermined threshold, where the payload reconstruction unit is further configured to be capable of dividing the payload of the data packet into the sub-groups having differing multiples of the TS packets from each other, and is configured to generate a plurality of reconstructed data packets each including a payload including one of the sub-groups of TS packets~ the number of which does not exceed the predetermined threshold, and a header indicating that the payload includes TS packets; and
   an output unit configured to selectively output the data packets received by the input unit and the reconstructed data packets generated by the payload reconstruction unit, to the second communication path.

* * * * *